United States Patent
Lin et al.

(10) Patent No.: US 12,475,353 B2
(45) Date of Patent: Nov. 18, 2025

(54) DOMAIN ADAPTATION FOR WIRELESS SENSING

(71) Applicant: QUALCOMM Incorporated, San Diego, CA (US)

(72) Inventors: Jamie Menjay Lin, San Diego, CA (US); Debasmit Das, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 17/483,434

(22) Filed: Sep. 23, 2021

(65) Prior Publication Data

US 2023/0085880 A1    Mar. 23, 2023

(51) Int. Cl.
 *G06N 3/04* (2023.01)
 *G06F 17/16* (2006.01)
 *G06N 3/08* (2023.01)
 *H04W 64/00* (2009.01)

(52) U.S. Cl.
 CPC ............... *G06N 3/04* (2013.01); *G06F 17/16* (2013.01); *G06N 3/08* (2013.01); *H04W 64/00* (2013.01)

(58) Field of Classification Search
 CPC .......... G06N 3/04; G06N 3/08; G06N 3/0464; G06N 3/09; G06N 3/048; G06N 3/084; G06N 3/045; G06F 17/16; H04W 64/00; H04W 24/08; G01S 5/0278; G01S 5/011; H04B 7/0413; H04B 7/0626
 See application file for complete search history.

(56) References Cited

U.S. PATENT DOCUMENTS

| 9,456,452 B2 | 9/2016 | Kim et al. |
| 2020/0244400 A1* | 7/2020 | Kim ...................... H04W 72/23 |

FOREIGN PATENT DOCUMENTS

WO   WO-2023012624 A1 *   2/2023   ........... H04B 7/0417

OTHER PUBLICATIONS

Chen X., et al., "Taming the Inconsistency of Wi-Fi Fingerprints for Device-Free Passive Indoor Localization", IEEE Infocom 2017, IEEE Conference on Computer Communications, Oct. 5, 2017, pp. 1-9, XP055620731, sections: I, III .A, IV.A, IV.B, IV.C, V, VI.A, VI.B, VII .A, figures 1, 2, 7.
International Search Report and Written Opinion—PCT/US2022/075514—ISA/EPO—Dec. 23, 2022.

(Continued)

*Primary Examiner* — Michael A Keller
(74) *Attorney, Agent, or Firm* — QUALCOMM Incorporated

(57) ABSTRACT

Certain aspects of the present disclosure provide techniques for domain adaptation. An input tensor comprising channel state information (CSI) for a wireless signal is determined, where each channel in the input tensor corresponds to a respective degree of freedom (DoF) in the wireless signal. A domain-adapted tensor is generated by processing the input tensor using a domain-adaptation network comprising, for each respective DoF in the wireless signal, a respective convolution path. The domain-adapted tensor is provided to a neural network trained for position estimation.

30 Claims, 9 Drawing Sheets

(56) References Cited

OTHER PUBLICATIONS

Wang X., et al., "CSI-based Fingerprinting for Indoor Localization: A Deep Learning Approach", IEEE Transactions on Vehicular Technology, [Online] vol. 66, Mar. 22, 2016, pp. 1-14, XP093006787, USA, Sections: I, figures 5, 6.

Yang L., et al., "Indoor Localization based on CSI in Dynamic Environments through Domain Adaptation", IEICE communications express, [Online], vol. 10, No. 8, Aug. 1, 2021, pp. 564-569, XP093006708, Sections: 1, 3.1, 3.2, figure 1.

Zhang J., et al., "CrossSense Towards Cross-Site and Large-Scale WiFi Sensing", Proceedings of the 2018 ACM International Conference on Interactive Surfaces and Spaces, ACM, New York, NY, USA, Oct. 15, 2018, pp. 305-320, XP058544906, sections: 1, 4, 6, figures 3, 4, 5.

Zheng T., et al., "Enhancing RF Sensing with Deep Learning: A Layered Approach", IEEE Communications Magazine, IEEE Service Center, Piscataway, US, vol. 59, No. 2, Mar. 10, 2021, pp. 70-76, XP011842051, sections I, V, figures 1, 3, table I.

\* cited by examiner

DOMAIN ADAPTATION FOR WIRELESS SENSING

INTRODUCTION

Aspects of the present disclosure relate to domain adaptation for wireless sensing.

Wireless perception and positioning have become increasingly prevalent in a variety of industries. For example, indoor positioning of objects (such as people, other mobile entities, and the like) is being actively developed for its wide range of consumer and business applications. However, wireless positioning (particularly indoor positioning) has also proven to be a challenging problem, especially with respect to the high dimensions and complexities in modeling multipath signals within an indoor environment. Moreover, even if a particular environment has been adequately modeled, minor changes (such as a simple move of one piece of furniture) can drastically impact the accuracy of subsequent inferences in conventional systems.

One significant problem in wireless positioning relates to environment de-fingerprinting, also referred to as domain adaptation. For example, when collecting training data in a particular environment for model training and testing, the collected data inherently encodes or reflects characteristics of the particular environment. This can result in significant domain shift if a model, trained in a first environment, is used or tested in a second environment different from the first environment. That is, models generally do not adapt well when deployed for an environment that differs from their training environment (or when the environment changes, such as due to rearranged furniture), resulting in significantly reduced accuracy.

It would be beneficial for models (e.g., for wireless sensing, positioning, or recognition of positioning targets such as people) that are developed or trained in one environment to be applicable or useful to other environment(s). However, such generalization of applicability is not trivial in deep learning-based data collection and model design. Conventional systems fail to provide such domain adaptation.

Accordingly, techniques are needed for improved domain adaptation in machine learning models.

BRIEF SUMMARY

Certain aspects provide a method, comprising: determining an input tensor comprising channel state information (CSI) for a wireless signal, wherein each channel in the input tensor corresponds to a respective degree of freedom (DoF) in the wireless signal; generating a domain-adapted tensor by processing the input tensor using a domain-adaptation network comprising, for each respective DoF in the wireless signal, a respective convolution path; and providing the domain-adapted tensor to a neural network trained for position estimation.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
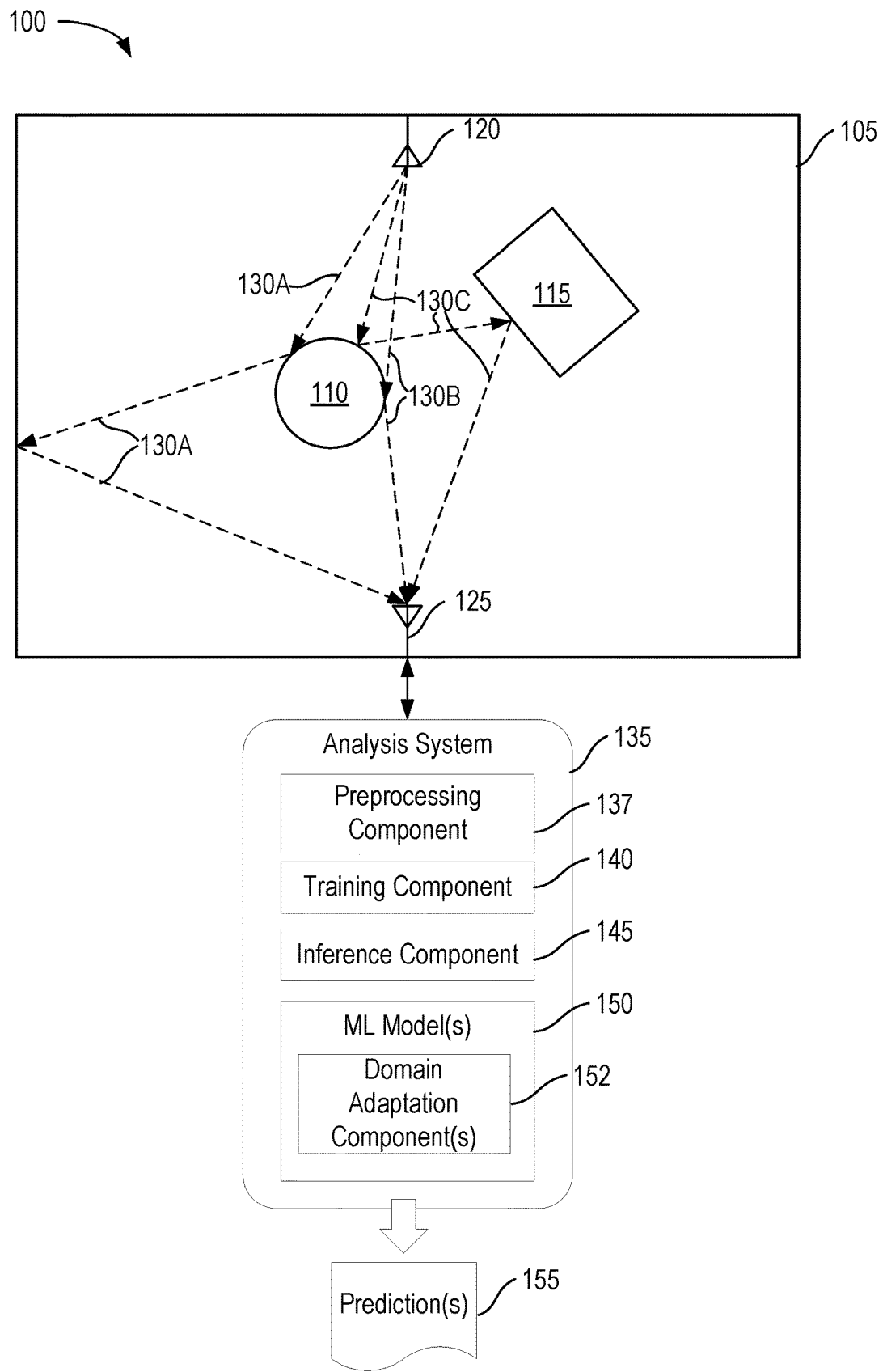
FIG. 1 depicts an example environment and system for wireless sensing using domain adaptation.

Aspects of the present disclosure provide techniques for improved domain adaptation in machine learning models. Though some aspects of the present disclosure use wireless sensing or positioning as example machine learning tasks, the domain adaptation techniques described herein are readily applicable to a wide variety of other machine learning tasks.

In some aspects of the present disclosure, improved domain adaptation is provided for wireless positioning in systems that use multiple-input multiple-output (MIMO) communication channels. Generally, wireless sensing or positioning involves analysis of signal characteristics from radio frequency (RF) signals in a space to predict or estimate the presence, location, or movement of objects (such as people, as well as other mobile, motile, locomotive, or otherwise itinerant entities) in a physical space.

Signal characteristics may generally include, without limitation, channel state information, signal strength (e.g., received signal strength or RSSI), phase(s) of the signals, carrier-frequency offsets of the signal(s), signal-to-noise ratio(s) of the signal(s), variance(s) of the signal(s), mean(s) of the signal(s), bandwidth of the signal(s), peak-to-average ratio(s) of the signal(s), or subcarrier(s) of the signal(s). Machine learning models may be trained to analyze signal characteristics and to output predicted locations of positioning targets (e.g., objects such as people). In some embodiments, the output of such models is multi-dimensional (e.g., a set of coordinates) indicating the location and/or movement (e.g., defined by a motion vector) of positioning targets in the space, including humans, vehicles, and the like.

MIMO wireless systems generally involve communicating data using multiple transmitting antennas (Tx) and multiple receiving antennas (Rx). By using multiple antennas on each side, wireless capacity and reliability can be increased substantially by transmitting different signals over the antennas. Relatedly, orthogonal frequency-division multiplexing (OFDM) involves dividing the radio channels into a number of (closely-spaced) sub channels, enabling more rapid and reliable communications. MIMO and OFDM can be combined in MIMO-OFDM systems, such as in wireless local area network (WLAN) systems, 5G and 5G broadband, and the like.

In some aspects of the present disclosure, the degrees of freedom (DoF) of the MIMO channel can be determined based on the number of transmitting antennas T and the number of receiving antennas R. In some aspects, the DoF of the system is equivalent to the number of transmitting antennas T multiplied by the number of receiving antennas R. That is, DoF=T*R. For example, if there are four transmitting antennas and four receiving antennas, the DoF of the system, as used herein, is sixteen. In some aspects of communication theory, the theoretical or physical DoF of a system may be considered to be equivalent to the minimum of T and R. However, as used herein, this definition of DoF can be relaxed to refer to the total number of all Tx/Rx pairs (e.g., T*R) for computational and operational purposes.

In an aspect, the unique physical environment can be at least partially characterized (or identified) through the RF signals. Generally, the signal characteristics of any given pair of a transmitting antenna and a receiving antenna (a Tx/Rx pair) in the MIMO channel is a complex scaled (e.g., due to attenuation) and time-shifted (e.g., due to the time-of-flight for the signal path) copy of the transmitted signal (potentially with some additive noise). In some embodiments, the time offset and phase shift used to define the MIMO signal can be recovered through signaling time reference (e.g., based on frame timing and/or boundaries) and the signal processing of channel estimation. Therefore, inter-symbol interference (ISI) and frequency selectivity (e.g., the multi-path effect) can be theoretically eliminated. In other words, if there is a single transmitting antenna and a single receiving antenna, there is only one Tx/Rx pair in the channel, and the multi-path effects (e.g., scaled time shifting) can be recovered. That is, when the DoF is one, there may be no perceptible or sensible change in the RF characteristics of the environment, even when the environment changes, and characterization of and adaptation to these changes may be trivial or unnecessary.

However, when the DoF is greater than one, any two non-identical environments may demonstrate vastly differing RF characteristics due to the complex combination of MIMO channels. Thus, when the DoF is greater than one, it is particularly useful to use robust domain adaptation to ensure adequate model performance. In aspects of the present disclosure, domain adaptation that is well-suited for such MIMO channels is provided.

In some aspects, the characteristics of the received signal are processed using one or more machine learning models (e.g., trained neural networks) to provide object sensing and positioning. In conventional systems, a full network is trained end-to-end based on the data, enabling it to provide positioning for the environment in which the data was collected. However, as discussed above, such models typically fail to generalize and perform poorly (with low accuracy) when the environment changes (e.g., when the model is deployed for a new environment, or when furniture or other obstacles in the space move).

In some aspects of the present disclosure, therefore, domain adaptation is performed by decomposing the received composite (MIMO) signal based on the DoFs involved (e.g., based on each united transmitter and receiver (Tx/Rx) pair). In at least one aspect, each Tx/Rx pair is identified based on a MIMO reference signal pattern. For example, one or more reference signal patterns may be specified (e.g., by a standards body) for MIMO signaling, such that the Tx antenna modules in the MIMO system are distinguishable by the Rx module(s) based on the reference signal patterns. That is, by using the reference signal patterns, the receiving device can identify which particular Tx antenna transmitted each particular received signal (e.g., each component of the composite MIMO signal).

Thus, as the receiving component(s) know which signal(s) were received on each Rx antenna, and can determine which Tx antenna transmitted each signal based on the reference patterns, the system is able to identify each individual signal path (e.g., the signal associated with each Tx/Rx pair) in the space. For example, if there are four Tx antennas and one Rx antenna, the system can use the reference signal pattern to identify the signal associated with each Tx antenna, resulting in four separate signals, each associated with a respective pair of the four separate Tx/Rx pairs. Similarly, if there are four Tx antennas and four Rx antennas, the system can identify, for each respective Rx antenna, the signal transmitted by each of the four Tx antennas (resulting in a set of four signals, each associated with a respective Tx/Rx pair that includes the respective Rx antenna). That is, the Rx portion of the Tx/Rx pair is determined based on the antenna that received the signal, and the Tx portion of each pair is determined based on evaluating the received composite signal using the reference pattern.

In one aspect, the signal associated with each Tx/Rx pair can then be injected into a dedicated subnet (e.g., a dedicated convolution path) in a domain-adaptation network or subnet, enabling the network to handle the complex MIMO signal.

In some aspects, the domain adaptation network may be used as a precursor or pre-processor to a universal model. For example, the input data may be provided to the domain adaptation network, which transforms it and provides it as input to a pre-trained feature extractor. In some aspects, the domain adaptation can be performed at other points, such as after feature extraction and before the data is passed to a classifier or regressor.

In some aspects of the present disclosure, the domain adaptation network can be trained or refined along with a universal model. For example, an aggregated superset of data samples (covering multiple different domains or environments) may be used to perform initial training of the entire network (including the domain adaptation subnet or network and the common or universal subnet(s) or model). Once this training is complete, in some aspects, the combined model can be used in a variety of domains and environments. Additionally, in some embodiments, the system may further specialize the model in individual domains by training, refining, or fine tuning the domain adaptation subnet, while keeping the parameters of the common or universal subnet frozen. In this way, a variety of different domain adaptation subnets can be trained, using a common task-related subnet, to address domain specific scenarios. For example, the shared or universal model can be used for all environments, while an appropriate domain adaptation network (trained based on data from the same or a similar environment) is selected based on the particular environment. In some aspects, the system may fine tune both the common subnet and the domain adaptation subnet to include new domains (e.g., if a new domain or environment with substantially different RF characteristics is encountered).

By using the domain adaptation techniques described herein, trained models are able to generalize and can perform with high accuracy across a range of environments with differing characteristics. For example, a model may be trained using data from one or more environments, and then deployed in a variety of other environments for use. Similarly, the model may continue to operate accurately even when the characteristics of the deployment environment change (e.g., due to rearranged furniture).

Example Environment for Wireless Sensing Using Domain Adaptation

FIG. 1 depicts an example environment 100 and system for wireless sensing using domain adaptation.

In the illustrated example, the environment 100 includes a physical space 105 (e.g., a room, outdoor area, and the like) including a positioning target 110 (e.g., a human) and an object 115 (e.g., furniture). Generally, the positioning target 110 corresponds to the object that is being tracked, located, or otherwise sensed in the physical space 105. The object 115 can correspond to any physical object that may interact with the RF signals, such as furniture, doors, and the like. Although a single positioning target 110 and object 115 are depicted for conceptual clarity, in aspects, there may be any number and variety of positioning targets 110 and objects 115.

As illustrated, the environment 100 also includes a transmitter 120 and receiver 125. Although depicted as discrete components for conceptual clarity, in some aspects, the transmitter 120 and receiver 125 may be combined (e.g., into a transceiver). Additionally, though a single transmitter 120 and a single receiver 125 are depicted for conceptual clarity, there may be any number of transmitters and receivers, each using any number of antennas.

Generally, the transmitter 120 is configured to transmit a composite wireless (e.g., RF) signal (e.g., a signal comprised of multiple individual signals, each carrying data), such as a MIMO signal. The receiver 125 is configured to receive the composite wireless signal. The wireless signal may undergo a variety of interferences and changes during "flight" between transmitter 120 and receiver 125. These may include reflection off of objects (including humans, walls, furniture, flora, and the like), refraction as the signal passes through objects, attenuation over the distance and through objects, constructive and destructive interferences, and the like.

In the illustrated example, a first portion 130A of the wireless signal leaves the transmitter 120, reflects off the positioning target 110, reflects again off the wall of the physical space 105, and reaches the receiver 125. A second portion 130B of the wireless signal leaves the transmitter 120, reflects off the positioning target 110, and reaches the receiver 125 without further interaction. A third portion 130C of the wireless signal leaves the transmitter 120, reflects off the positioning target 110, reflects again off of the object 115, and reaches the receiver 125. Of course, the depicted signals and reflections are merely included as illustrative examples, and there may be many more signal paths in the space (and some signals transmitted by the transmitter 120 may not reach the receiver 125). Generally, the environmental characteristics (resulting in reflections and refractions) can change the characteristics of the received signals in a variety of ways, such as attenuation (when the signal strength decreases due to obstacles or distance) and constructive or destructive interference (when components of the signal align due to reflections or refractions, resulting in changed received signal characteristics).

In the illustrated example, some characteristics of the signal received at the receiver 125, such as the channel state information (CSI), are provided to an analysis system 135. The depicted analysis system 135 includes a preprocessing component 137, a training component 140, an inference component 145, and a set of one or more ML models 150. In some aspects, the preprocessing component 137 can generally perform preprocessing operations on the data, such as extracting the CSI information (if the raw signal data is provided to the analysis system 135), formatting the data into an appropriate tensor for processing, and the like.

The training component 140 is generally configured to train the one or more machine learning (ML) models 150 based on the data (and a corresponding set of labels). The inference component 145 is generally configured to generate predictions 155 (e.g., locations of positioning targets, movement of the targets, and the like) by processing the received data using the trained ML model(s) 150. Although training and inferencing are both depicted as being performed by the analysis system 135, in some aspects, the training (which may include full training, fine-tuning, iterative refinement, online training, and the like) may be performed on one or more other devices. That is, the training component 140 may operate on one or more other systems to train the ML models 150, and the models may subsequently be deployed to the analysis system 135 to evaluate data in runtime.

In an aspect, the ML model(s) 150 each include one or more domain adaptation components 152, as discussed below in more detail. The domain adaptation component 152 may generally be a neural network (or a subnet of a neural network) that is trained to adapt the signal data to allow the downstream portions of the model (e.g., feature extraction and classification) to operate in a domain-agnostic way. In at least one aspect, as discussed in more detail below, the domain adaptation component 152 includes a separate convolution path for each DoF in the received composite signal (e.g., for each Tx/Rx pair).

In one aspect, the training component 140 can train the ML models 150 (including the domain adaptation component(s) 152) based on a set of training records, where each record indicates the data (e.g., the CSI of signal received at a receiver, such as receiver 125, at a given time or during a given window) and a corresponding ground-truth label (e.g., coordinates or other information indicating the positions of each positioning target 110 in the space). For example, the training component 140 may process the data portion of the record using the ML model 150 (e.g., through the domain adaptation network, followed by through the positioning network). The resulting output prediction can then be compared against the ground-truth label to generate a loss, which can be used to refine the positioning network and/or the domain-adaptation network (e.g., via backpropagation). Generally, backpropagation involves computing the gradient of the loss function with respect to the network weights in a given layer, and iterating backwards (from the last layer towards the first).

In some aspects, as discussed below in more detail, the training component 140 can synthesize or simulate other domains using random affine transformations on the input data. This simulation or synthetization can expose the ML model 150 to additional (simulated) environments during training, allowing it to generalize more readily to new or unknown environments.

In an aspect, once the ML model 150 is trained and deployed, the inference component 145 can process newly-received signal data from the receiver 125 using the ML model 150 to generate a set of one or more predictions 155. For a positioning task, the predictions 155 can generally indicate the location, movement, and/or presence of any positioning targets 110 in the physical space 105.

In at least one aspect, for new environments, the ML model 150 can be deployed without further refinement. In some aspects, the training component 140 may be used to refine the domain adaptation portion of the ML model 150 for the new environment, while the positioning (or other task) portion is fixed. In such an embodiment, the task subnet remains applicable to general (or aggregated) domain data, and the domain adaptation subnet can take the burden of adaptation to specific domains (e.g., through fine tuning).

Example System for Positioning Using Domain Adaptation

Figure 2:
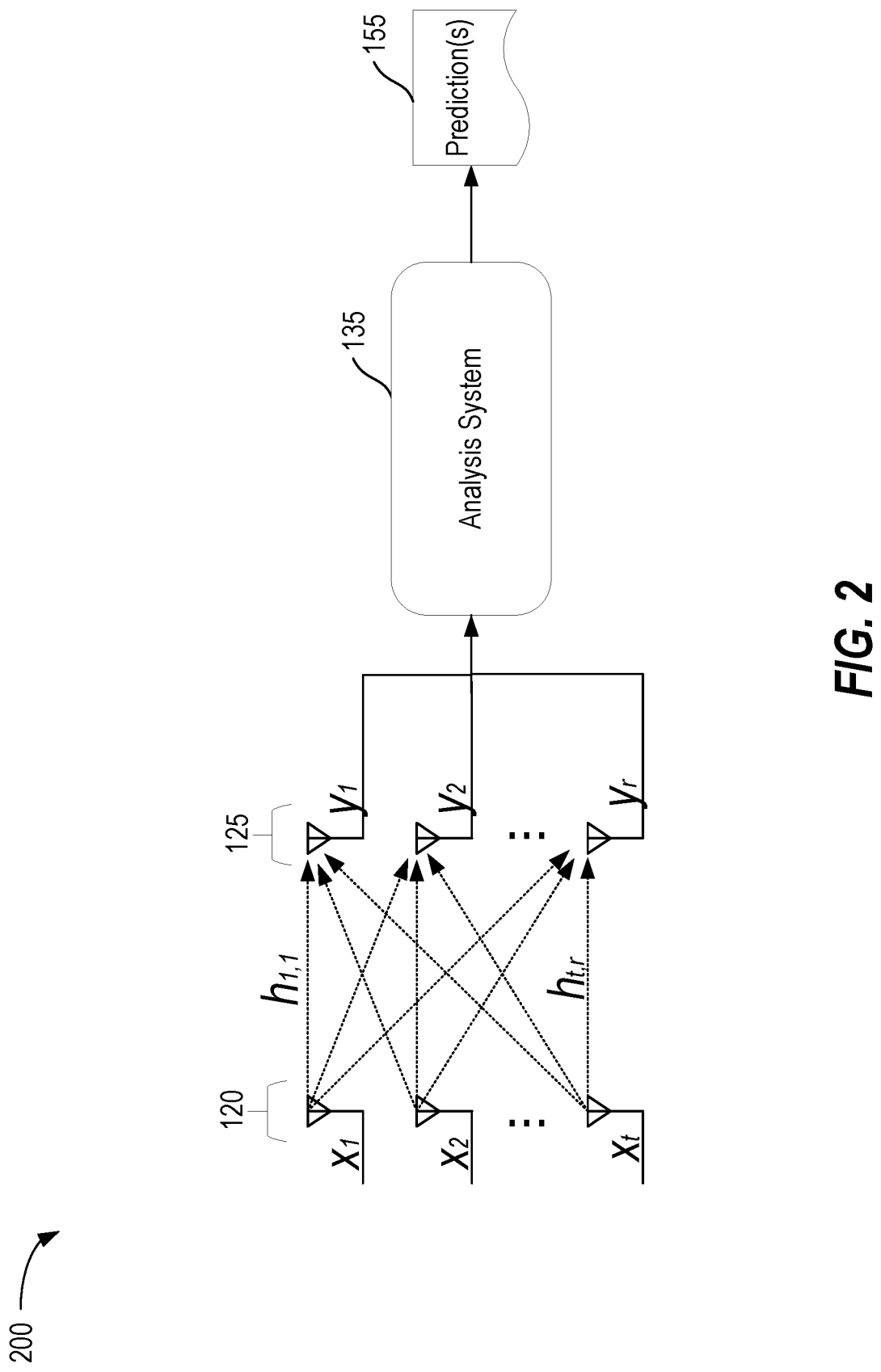
FIG. 2 depicts an example wireless system configured to provide positioning predictions using domain adaptation.

FIG. 2 depicts an example wireless system 200 configured to provide positioning predictions using domain adaptation.

As discussed above, MIMO involves transmitting a composite signal via multiple transmitting antennas 120 to multiple receiving antennas 125. In the illustrated example, there are T transmitting antennas 120 and R receiving antennas 125. Each transmitting antenna 120 transmits corresponding input data x (e.g., $x_1$ for the first antenna, $x_2$ for the second, and $x_t$ for the t-th). Similarly, each receiving antenna 125 receives some input data y (e.g., $y_1$ for the first antenna, $y_2$ for the second, and $y_r$ for the r-th).

As discussed above, the received signal y generally differs from the transmitted signal x due to various interference, attenuations, reflections, refractions, and the like in the environment. In the illustrated example, these environmental characteristics for a given Tx/Rx pair are reflected by h, where the subscript indicates the Tx/Rx pair. For example, $h_{1,1}$ indicates the environmental characteristics affecting the signal between the first transmitting antenna 120 and the first receiving antenna, while $h_{t,r}$ indicates the environmental characteristics affecting the signal between the t-th transmitting antenna 120 and the r-th receiving antenna 125.

In at least one aspect, the received signal y can be modeled as y=Hx+n, where y is the transmitted signal (over some defined window of time), H is the collective environmental characteristics (e.g., for each Tx/Rx pair), and n is additive white Gaussian noise (AWGN) over time at the receiver 125. Generally, the AWGN (or other noise component) represents the random noise processes that can affect the signal during the flight from the transmitter(s) to the receiver(s).

As illustrated, the received signals y (or characteristics of the signals, such as the CSI, RSSI, and the like) are provided to the analysis system 135 to generate predictions 155 (and to train the models, where applicable). That is, in the illustrated example, the transmitted signals x are not needed or used to generate the predictions 155.

In some aspects, as discussed above, the analysis system 135 processes the received data using a trained domain-adaptation network that includes a separate convolution path for each DoF in the composite signal (e.g., for each Tx/Rx pair), as compared to conventional systems that use a single path for the collective signal. This can enable accurate and efficient domain adaptation (e.g., enabling the system to handle the particular environmental characteristics H of the space), allowing the analysis system 135 to generalize well to new or changing environments.

Figure 3:
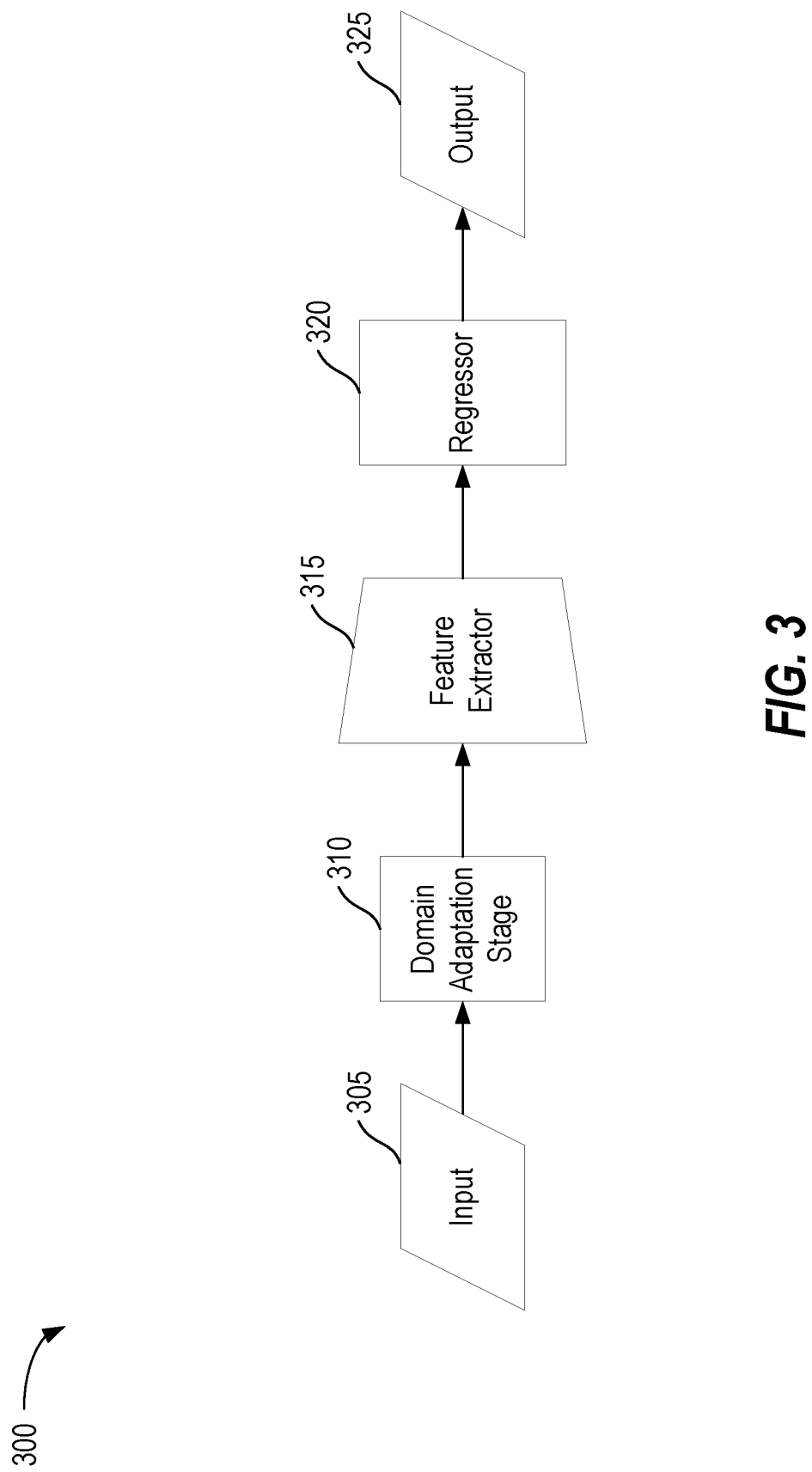
FIG. 3 depicts an example workflow for generating position predictions using a domain-adapted machine learning model.

Example Workflow for Generating Predictions Using a Domain Adapted Machine Learning Model FIG. 3 depicts an example workflow 300 for generating position predictions using a domain-adapted machine learning model.

The workflow 300 begins when input 305 is received. As discussed above, the input 305 may generally correspond to one or more characteristics of a composite wireless signal (e.g., a MIMO signal) received by one or more antennas (e.g., extracted or generated by the preprocessing component 137 of FIG. 1). For example, the input 305 may include CSI data, RSSI data, and the like. In some aspects, the input 305 is formatted as a tensor with dimensions C×H×W, where C is the number of channels (also referred to as the depth in some aspects), H is the height of the tensor, and W is the width of the tensor. This formatting may be performed by the analysis system (e.g., the preprocessing component 137 in FIG. 1), or by some other intermediate or pre-processing component (e.g., by the receiver device).

In various aspects, the input tensor can be formed in a variety of ways based on the input 305. In at least one aspect, the height of the tensor H corresponds to the number of subcarriers per OFDM signal in the composite signal, the width W corresponds to the number of OFDM symbols used (over time) when processing the signal within the neural network, and the channel depth C corresponds to the number of Tx/Rx pairs in the signal. Of course, in various aspects, other formulations can be used.

For example, if an OFDM symbol in the signal has 1024 subcarriers, the data tensor can be created with a height H=1024 by stacking up all the subcarriers to form the height dimension. Similarly, if the system defines each unit of block processing (within the neural network) as 10 OFDM symbols over time, then W=10 and each such OFDM symbol is stacked over the width dimension. That is, the system (or an administrator) may specify the number of OFDM symbols to be processed per batch, and arrange the input tensor to include this specified number of (temporal) OFDM symbols. In the next batch, the system can similarly include ten OFDM symbols in the input tensor. In one aspect, the system selects the next ten symbols (temporally) in the signal (e.g., there may be no overlap between batches). In other aspects, the system can use an overlapping set of symbols (e.g., including five symbols from the previous batch, and five new symbols) for batch processing.

Additionally, if there are four transmitting antennas and four receiving antennas, the system may construct the input tensor to have a channel depth of sixteen, one for each Tx/Rx pair, by stacking all Tx/Rx pairs of signals over the channel dimension.

As illustrated, the input 305 is provided to a domain adaptation stage 310. Generally, the domain adaptation stage 310 is configured to transform the input 305 into a domain-adapted data tensor. In some aspects, the domain adaptation stage 310 is a neural network (or a subnet of a neural network). One example architecture for the domain adaptation stage 310 is discussed in more detail below with reference to FIG. 4.

In the illustrated workflow 300, the domain adaptation stage 310 is used at the outset of data processing (e.g., prior to feature extraction). In at least one aspect, the domain adaptation stage 310 can be used prior to a domain-agnostic or universal full neural network that has been trained to provide object sensing or positioning. By using the domain adaptation stage 310 prior to feature extraction by feature extractor 315, the system is able to use a feature extractor 315 that was not trained or specific for the particular environment, as the domain-specific aspects of the signal are eliminated or reduced. In contrast, conventional systems typically attempt to provide domain adaptation after feature extraction. As a result, domain-specific biases are propagated throughout the entire network during training, rendering it difficult or impossible to generalize to new domains.

In the workflow 300, the output of the domain adaptation stage 310 (e.g., a domain-adapted tensor) is provided as input to a feature extractor 315. The feature extractor 315 is generally configured to extract features of the input data (e.g., a set of values that are informative of the desired task), which can be subsequently used to classify the input (or perform some other task). In some aspects, the feature extractor 315 corresponds to a stage of a neural network, or one or more feature extraction layers of the neural network. Because the domain adaptation stage 310 provides a domain-adapted tensor (rather than the original input data), the feature extractor 315 can operate in a domain-agnostic manner.

As illustrated, the extracted features are then provided to a regressor 320 (or a classifier in some aspects, if the task is a classification problem rather than regression). In some aspects, the regressor 320 (or classifier) corresponds to a stage of a neural network, or one or more classification or regression layers of the neural network. Generally, the regressor 320 is configured to output a continuous value (as opposed to a classifier, which classifies the input features into defined classes).

The output 325 of the regressor 320 (or classifier) generally depends on the task of the model. For example, in a wireless sensing task, the output 325 can generally correspond to the locations, orientations, and/or movement of one or more positioning targets in the space.

In the illustrated example, the domain adaptation stage 310 is used only before the feature extractor 315. In some aspects, however, the domain adaptation stage 310 can generally be applied at any layer of the model, such as between the feature extractor and the classifier.

In some aspects, as discussed above, the domain adaptation stage 310 is used to provide domain adaptation for the environment, while the rest of the model (e.g., the feature extractor 315 and regressor 320) remain general and domain-agnostic. In at least one aspect, the system may define a set of common or popular domains (e.g., an urban domain, an indoor domain, a bus domain, a train domain, a ship domain, a plane domain, and an open plaza domain). The shared portions of the model (e.g., the feature extractor 315 and regressor 320) can then be trained using the aggregated/general dataset across all domains, while a respective domain adaptation stage 310 is trained for each individual domain (using the corresponding data samples). As the domain adaptation stage 310 is generally significantly smaller (with far fewer parameters or weights) than the task-specific subnet(s), this refinement process can be applied rapidly and efficiently, as compared to refining the entire model.

In one aspect, at inference time, the system can determine or infer the specific domain where the signals were collected, and the pre-trained weights of the corresponding the domain adaptation stage 310 can be used, while keeping the parameters of the feature extractor 315 and regressor 320 fixed. As discussed above, because the domain adaptation stage 310 is likely to be significantly smaller (with far fewer parameters or weights), this dynamic process can be applied efficiently.

Example Method Workflow for Generating Domain Adapted Tensors

Figure 4:
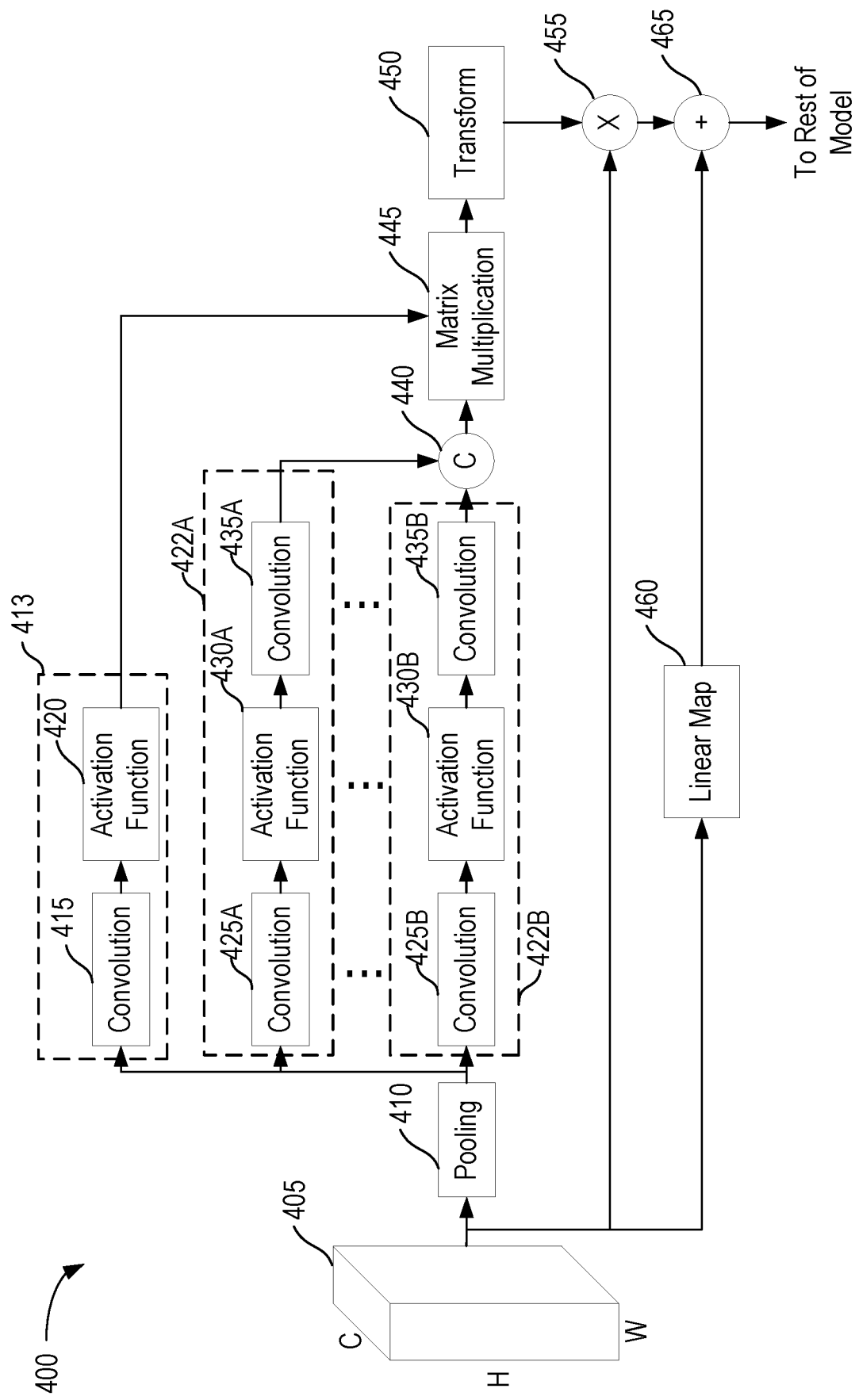
FIG. 4 depicts an example workflow for generating domain-adapted tensors based on input tensors.

FIG. 4 depicts an example workflow 400 for generating domain-adapted tensors based on input tensors. In some aspects, the workflow 400 may correspond to the domain adaptation stage 310 discussed above with reference to FIG. 3.

As illustrated, an input tensor 405 is received. In an aspect, each element of the input tensor 405 corresponds to signal characteristics (e.g., CSI data) of a received composite wireless signal (such as in a MIMO system). In the illustrated example, the input tensor 405 has dimensionality of C×H×W. In at least one aspect, the height of the tensor H corresponds to the number of subcarriers per OFDM signal in the composite signal, the width W corresponds to the number of OFDM symbols used (over time) when processing the signal within the neural network, and the channel depth C corresponds to the number of Tx/Rx pairs in the signal. In some aspects, the input tensor 405 may be defined as $Y_{C \times H \times W, CSI}$, indicating that it is a tensor of CSI data that is generated based on received signal data (Y) and has dimensionality C×H×W.

As illustrated, the input tensor 405 is provided to a pooling operation 410. In at least one aspect, the pooling operation 410 corresponds to a per-channel global average pooling operation. That is, the pooling operation 410 may, for each channel in the input tensor 405, determine the average value across the height and width dimensions. In such an aspect, the output of the pooling operation 410 is a tensor with dimensionality C×1×1. In an aspect, this output may be referred to as a channel tensor for ease of reference. Although global average pooling is discussed, in other aspects, the pooling operation 410 may include other pooling types (such as max pooling).

As illustrated, the channel tensor is then provided to a variety of convolution paths 413 and 422. In an aspect, the uppermost convolution path 413 (including convolution 415 and activation function 420) may be used to process the channel tensor to redistribute weighting of each channel. That is, each channel in the input (e.g., each Tx/Rx pair in the signal) may have varying magnitudes or amplitudes based on the environmental characteristics (e.g., each Tx/Rx pair may have differing amounts of attenuation, resulting in differing signal strength for each). In an embodiment, the upper convolution path 413 is used to attempt to find a set of weights that equalize these differences such that, after domain adaptation, the differences between the channels is reduced (e.g., such that the channels each have the same, or a similar, magnitude. This can help reduce or eliminate the effect of the environment on the signal.

In at least one aspect, the convolution 415 corresponds to a pointwise convolution (e.g., a 1×1) convolution, transforming the channel tensor to a tensor of dimensionality D×1×1, where D is the DoF of the signal. In some aspects, as discussed above, D corresponds to the number of Tx/Rx pairs. That is, in an aspect, D=C. In an embodiment, the number of Rx antennas is known by the analysis system, as it operates directly with the receiver(s). Further, through system signaling (from the transmitting component) or predefined configuration, the analysis system may determine the number of Tx antennas. In this way, the system can define D.

As illustrated, this tensor is then processed by an activation function 420, resulting in an output tensor of dimensionality D×1×1. In some aspects, this output may be formatted as a column vector $S_{D \times 1}$, referred to as a channel weighting vector for ease of reference. In aspects, the particular activation function 420 selected may differ. In at least one aspect, the activation function 420 corresponds to a softmax activation over the channels of the channel tensor. This channel weighting vector is then provided to a matrix multiplication operation 445, discussed in more detail below.

Returning to the channel tensor output by the pooling operation 410, as illustrated, the data is also provided to a set of convolution paths 422 that are each specific to a corresponding DoF of the MIMO signal (e.g., to a Tx/Rx pair). In the illustrated example, this includes a first convolution path 422A for a first DoF (including convolution 425A, activation function 430A, and convolution 435A), and a second convolution path 422B for a second DoF (including convolution 425B, activation function 430B, and convolution 435B).

As indicated by the ellipses, there may be any number of these DoF-specific convolution paths 422 (in addition to the convolution path 413 used for channel weighting). As discussed above, in at least one embodiment, there is a respective convolution path 422 for each DoF in the signal. Additionally, as discussed above, the input tensor 405 may be formatted such that the channel dimension corresponds to the DoF of the signal (e.g., with signal data for each Tx/Rx pair assigned to a respective channel). Thus, in the illustrated aspect, a separate DoF-specific convolution path 422 is used to process each channel of the channel tensor (and, therefore, each Tx/Rx pair is processed by a separate convolution path 422), allowing the domain adaptation network to reduce or eliminate the varying effects of the environment on each DoF (thereby reducing or eliminating the impact of the environment on the signals, allowing the model to generalize well).

In some aspects, each convolution path 422 processes a single channel in the channel tensor (rather than all channels). That is, for each respective Tx/Rx pair (which is associated with a corresponding channel in the input tensor 405), the data in this corresponding channel is injected to a corresponding convolution path 422. Generally, each convolution path 422 may include channel projection, a nonlinearity function at the bottleneck, and channel expansion back to the original dimensionality. Generally, data projection followed by expansion causes the network to digest the data with different dimensions, forcing it to improve learning by undergoing discriminative operations and generative operations. This bottleneck technique can thereby result in improved learning for the model.

For example, the convolutions 425A and 425B may correspond to pointwise (e.g., 1×1) convolutions that result in an output tensor of dimensionality R×1×1, where R is a hyperparameter that is less than C. The activation functions 430A and 430B may be selected to provide nonlinearity (e.g., via a ReLu or Swish function). The output of the activation functions 430A and 430B remains R××1. Additionally, the convolutions 435A and 435B may be another pointwise (1×1) convolution, which expand the tensor back to C×1×1.

As illustrated, the output of each convolution path 422 is provided to a concatenation operation 440. As discussed above, there are D convolution paths 422, one for each DoF of the received composite signal. In an aspect, the concatenation operation 440 concatenates all the channels of each DoF (e.g., the output of each convolution path 422) and concatenates all of the DoFs to yield a matrix:

$$M_{C \times D} = [M_{C \times 1, 0}, M_{C \times 1, 1}, \ldots, M_{C \times 1, D}].$$

In some aspects, this matrix $M_{C \times D}$ is referred to as a DoF matrix for ease of reference. As discussed above, the input to the concatenation operation 440 is a set of D tensors or vectors (output from each convolution path 422), each with a dimensionality of C×1×1. In one aspect, the system can use an unsqueeze operation, which can reshape each tensor, to add a dimension at position one to each such tensor (causing them to be compatible with subsequent operations). This results in D tensors with dimensionality C×1×1×1. The concatenation operation 440 can then stack up all D tensors, such that a tensor of dimensionality C×D×1×1 is formed. This tensor serves as the DoF matrix.

In the illustrated workflow 400, the DoF matrix $M_{C \times D}$ (output by the concatenation operation 440) and the channel weighting vector $S_{D \times 1}$ are then provided to a matrix multiplication operation 445, which multiplies the input matrices to generate an attention matrix:

$$M_{C \times 1} = M_{C \times D} \times S_{D \times 1}.$$

As illustrated, the attention matrix $M_{C \times 1}$ is then provided to a transformation operation 450, which applies a transform function $T(\cdot)$ that results in a mask matrix:

$$M'_{C \times 1} = T(M_{C \times 1}).$$

In some aspects, the transform function $T(\cdot)$ implemented in transformation operation 450 is a nonlinear activation function; however, various transform functions can be used for the transformation operation 450. Generally, the transform function controls how much domain divergence the system can model between the training and testing or deployment environments, as discussed below.

For example, a sigmoid function $T(x)=1/(1+e^{-x})$ produces an output in the range from 0 to 1. As a result, the system may model small positive shifts in the input signal from the source environment to the target environment, and the shift is bounded by the values of the input CSI signal. As another example, a hyperbolic tangent function $T(x)=(e^x-e^{-x})/(e^x+e^{-x})$ produces an output in the range of −1 to 1. As a result, it can model small positive and negative shifts in the input signal from the source environment to the target environment. Still, however, the shift is bounded by the values of the input CSI signal both on the positive and the negative direction. As a third example, the transformation operation 450 may use a rectifier function $T(x)=\max(0,x)$, which produces unbounded positive output. As such, it can model large positive shifts in the input signal from the source environment to the target environment.

In an aspect, the particular transformation function 450 may be selected based on the nature of the task and the expectations relating to the possible changes in the RF environment.

In the illustrated workflow 400, the mask matrix $M'_{C \times 1}$ is then provided to a multiplication operation 455. Additionally, the original input tensor 405 is provided to the multiplication operation 455. The multiplication operation 455 generates a residual tensor $Y_{C \times H \times W, RE}$ by performing element-wise multiplication (with appropriate broadcasting of the mask matrix to ensure the dimensionality matches the input tensor 405) between the input tensor 405 ($Y_{C \times H \times W, CSI}$) and the mask matrix $M'_{C \times 1}$.

Additionally, as illustrated, the input tensor 405 is provided to a linear map operation 460. In some aspects, the linear map operation 460 is defined as $L(\cdot)$, which is a linear transformation used to scale the input CSI signals such that the domain divergence between source and target environments due to signal attenuation or amplification is reduced. For example, in some embodiments, when the divergence in the CSI signals between the source and target environments is due to attenuation or amplification of the signals, the liner map operation 460 is used to scale the input tensor 405 appropriately based on this difference. Additionally, in some aspects, if scaled domain-shift is not relevant (e.g., because the differences between the source and target environments do not include attenuation or amplification of the signals), the linear map operation 460 can be implemented as an identity transformation (e.g., that outputs the unchanged input tensor) that does not change the input tensor 405. In one aspect, the output of the linear map operation 460 is referred to as a scaled input tensor for ease of reference.

As illustrated, the workflow 400 then includes a final summation operation 465, which generates a domain-adapted output tensor $Y_{C \times H \times W, DA} = L(Y_{C \times H \times W, CSI}) + Y_{C \times H \times W, RE}$. That is, the domain-adapted output tensor is the summation of the scaled input tensor (output by the linear map operation 460) and the residual tensor (output by the multiplication operation 455).

As illustrated, the domain-adapted tensor is then provided to the next stage of the model (e.g., to the first layer of a neural network trained to provide object sensing or positioning, such as the feature extractor 315 described with reference to FIG. 3). Notably, in an embodiment, the domain-adapted tensor has the same dimensionality as the original input tensor 405 (e.g., C×H×W), allowing the domain adaptation to be inserted anywhere in the model (e.g., before the neural network's first layer, after one or more feature extraction layers and before classification layers, and the like).

In some aspects, as discussed above, the task-specific portion of the model (e.g., the positioning subnet(s)) may be domain-agnostic, and reflect a generic or idealized domain or environment. In the physical world, however, this portion of the model may perform poorly in non-ideal environments. As the domain adaptation portion handles these environments, the system may use the domain adaptation prior to the task portion (e.g., prior to feature extraction, as discussed above). In at least one aspect, the system may additionally apply the domain adaptation subnet in the middle of, or after the end of, the task-specific portion, allowing the task to be performed while preserving incoming and outgoing features of the environment where relevant.

In some aspects of the present disclosure, the depicted operations (e.g., pooling 410, convolutions 415, 425, and 435, activation functions 420 and 430, concatenation operation 440, matrix multiplication operation 445, transformation operation 450, multiplication operation 455, linear map operation 460, and summation operation 465) may be referred to as a domain adaptation network or subnet. For example, these blocks may form the domain adaptation stage 310 of FIG. 3. This network (or subnet) may be used at various points of a full neural network, as discussed above.

Example Method for Training a Domain-Adapted Machine Learning Model

Figure 5:
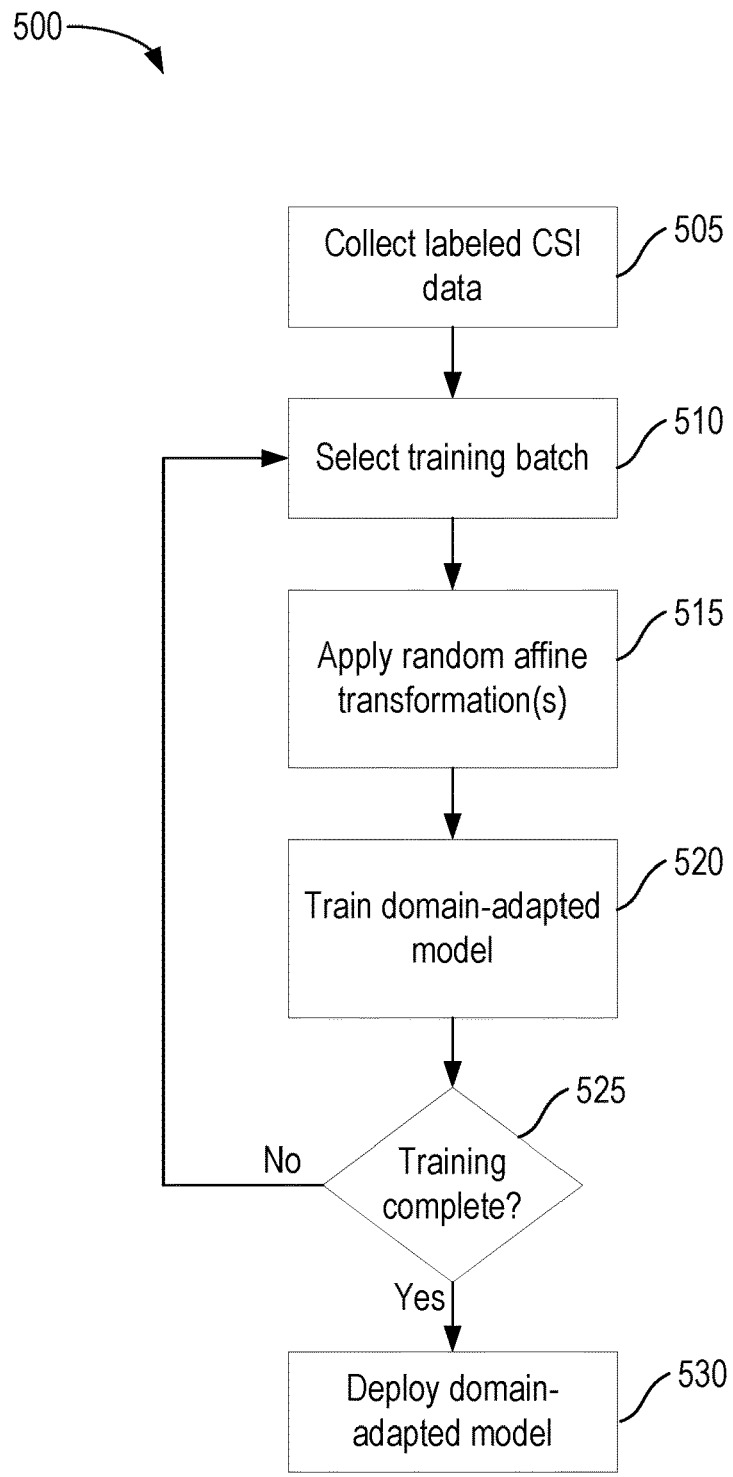
FIG. 5 depicts an example flow diagram illustrating a method for training a domain-adapted machine learning model.

FIG. 5 depicts an example flow diagram illustrating a method 500 for training a domain-adapted machine learning model.

The method 500 begins at block 505, when a training system (e.g., the analysis system 135 of FIG. 1) collects labeled CSI data for a physical space. In an embodiment, the training data may be defined as $\{CSI_A, L_A\}$, where $CSI_A$ is the data itself (e.g., characteristics of received signals, such as CSI data) from environment A, and $L_A$ are the corresponding label(s) for the CSI data, which may, for example, indicate the ground-truth location or position of each positioning target in the space (such as positioning target 110 in FIG. 1). Depending on the particular implementation, these labels may specify two-dimensional coordinates (e.g., along a plane, such as the floor, in the space) or three-dimensional (e.g., including a height position). In at least one aspect, each record corresponds to data collected for some defined window of time, and is formatted as discussed above (e.g., into a C×H×W tensor).

In some embodiments, collecting the training data includes collecting data from multiple different environments, which may help improve the domain adaptation of the model. Additionally, in the illustrated example, the training can also be augmented using a domain simulation setup for each training batch.

Specifically, at block 510, the system selects a training batch. In at least one embodiment, the selected training batch corresponds to the batch that is currently being used to refine the model. That is, the system may use the collected training data to refine the domain-adapted model in batches. For each batch, the system can perform blocks 515 and 520 before moving to the next batch.

At block 515, the system applies one or more random affine transformations (e.g., any transformation that preserves collinearity and parallelism) to the training batch to provide domain simulation. In an aspect, this can ensure that the model is exposed to additional different (simulated) domains, making it more generalizable to unknown testing or deployment environments. In one aspect, the affine transformations are defined as $Y'=UY+V$ on the input tensor batch Y to produce transformed input where the affine transformation parameters U and V are sampled from a distribution family. In various embodiments, the hyperparameters of the distribution family (used to determine the affine transformation parameters) can be trained or manually defined. Additionally, in some aspects, the distribution itself is selected based on the characteristics of the environment(s). For example, if the random noise introduced by the training environment is a Poisson process, the system may select a distribution that works well with Poisson processes (as opposed to, for example, a Gaussian distribution).

As illustrated, at block 520, the system then trains or refines the domain-adapted model based at least in part on the transformed batch Y'. In an embodiment, the system also refines the model based on the original (untransformed) batch Y.

Generally, training the model based on the data includes processing the data portion of the record ($CSI_A$) from environment A using the model (e.g., through the domain adaptation network, followed by through the positioning network). The resulting output prediction can then be compared against the ground-truth label ($L_A$) to generate a loss (e.g., cross-entropy loss, KL divergence, maximum mean discrepancy, and the like), which can be used to refine the positioning network (e.g., the feature extractor 315 and regressor 320 in FIG. 1) and/or the domain adaptation network (e.g., the domain adaptation stage 310 in FIG. 1) (e.g., via backpropagation).

In some aspects, as discussed above, the system may initially train both the domain adaptation network and the positioning network. To adapt to a specific domain, in one aspect, the positioning network may be fixed while the parameters of the domain adaptation network are refined or fine-tuned. In at least one aspect, for a new environment, the system can fine-tune the positioning network (e.g., modifying the pre-trained weights) while entirely retraining the domain adaptation network (e.g., beginning anew with randomized weights). As discussed above, as the domain adaptation stage is generally smaller than the task stage, it can generally be trained or refined more quickly than the task stage.

Once the model has been trained based on the current batch (and transformed batch), the method 500 continues to block 525, where the system determines whether training is complete. In various aspects, this determination may be made based on a variety of termination criteria, including a maximum number of training epochs or batches, a maximum amount of time spent training, a determination as to whether additional training data remains, and the like. If the training is not complete, the method 500 returns to block 510 to proceed to the next training batch. If training is complete, the method 500 terminates at block 530, where the domain-adapted model is deployed for use in processing received signal data (e.g., to predict positioning target locations).

Note that FIG. 5 is just one example of a method, and other methods including fewer, additional, or alternative steps are possible consistent with this disclosure.

Example Method for Generating Position Predictions Using a Domain-Adapted Model

Figure 6:
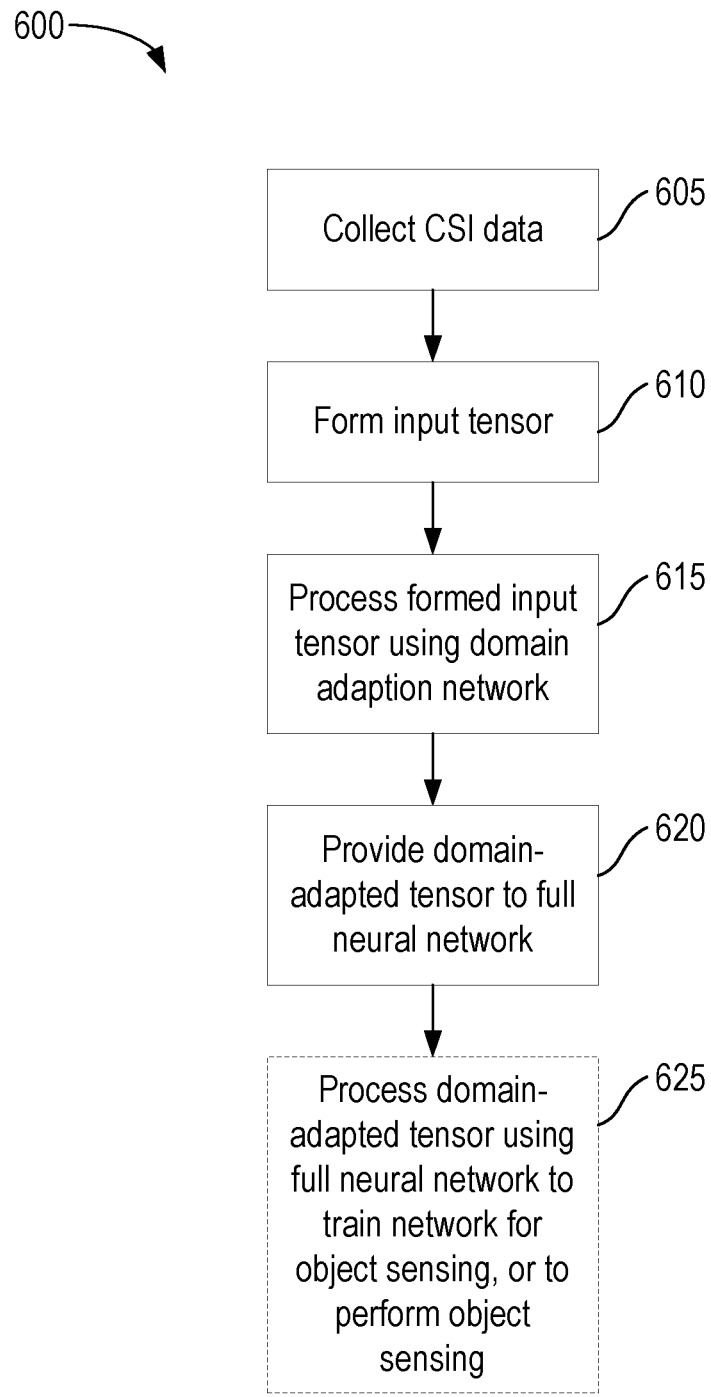
FIG. 6 depicts an example flow diagram illustrating a method for generating position predictions using a domain-adapted machine learning model.

FIG. 6 depicts an example flow diagram illustrating a method 600 for generating position predictions using a domain-adapted machine learning model, such as the domain adaptation stage 310, feature extractor 315, and regressor 320 of FIG. 3. In some aspects, the method 600 may be performed by an analysis system (such as the analysis system 135 of FIG. 1).

At block 605, the system collects or generates CSI data for a physical space. For example, as discussed above, the system may evaluate characteristics of a received composite signal (e.g., in a MIMO system) to determine the CSI, RSSI, and the like. In various aspects, the signal characteristics data can be generated, collected, or otherwise determined by any suitable device, including the receiver, the analysis system itself, and the like. In some aspects, collecting the CSI data is performed over a defined window of time. That is, the system may process the CSI data in blocks based on the time it was received, outputting a prediction for each such block/window.

At block 610, the system forms an input tensor based on the CSI data. For example, as discussed above, the system may format the data into a tensor having dimensionality of C×H×W, where the height of the tensor H corresponds to the number of subcarriers per OFDM signal in the composite signal, the width W corresponds to the number of OFDM symbols used (over time) when processing the signal within the neural network (e.g., the number of symbols included in the window of time used to collect the CSI data), and the channel depth C corresponds to the number of Tx/Rx pairs in the signal.

The method 600 then continues to block 615, where the system processes the formed input tensor using a domain adaptation network (such as the domain adaptation component 310 of FIG. 3), as discussed above. For example, the system may use the workflow 400, discussed above with reference to FIG. 4, to transform the input tensor into a domain-adapted input tensor. One example of generating the domain-adapted tensor is discussed in more detail below, with reference to FIG. 7.

At block 620, the domain-adapted tensor is then provided to a subsequent neural network stage (e.g., to the first layer of a trained neural network, or to a feature extractor). As discussed above, this domain adaptation allows the neural network to generalize and handle new or changing domains well. The full neural network may be configured to perform any variety of computing tasks.

In the illustrated aspect, at block 625, the system optionally processes the domain-adapted tensor using the full neural network in order to either train the model to provide object sensing and/or positioning in a space based on the signal characteristics, or to perform object sensing and/or positioning (if the model has already been trained). Though object sensing and/or positioning is used as one example task, in aspects, the domain-adapted tensor can be used for a variety of tasks.

Although not included in the illustrated example for conceptual clarity, in some aspects, the method 600 may be repeated according to a wide variety of criteria, such as whenever new CSI data is available (e.g., for the next or subsequent windows of time). In this way, the system can iteratively generate position predictions, enabling the objects to be tracked at various times throughout the space.

Note that FIG. 6 is just one example of a method, and other methods including fewer, additional, or alternative steps are possible consistent with this disclosure.

Example Method for Generating Domain Adapted Tensors

Figure 7:
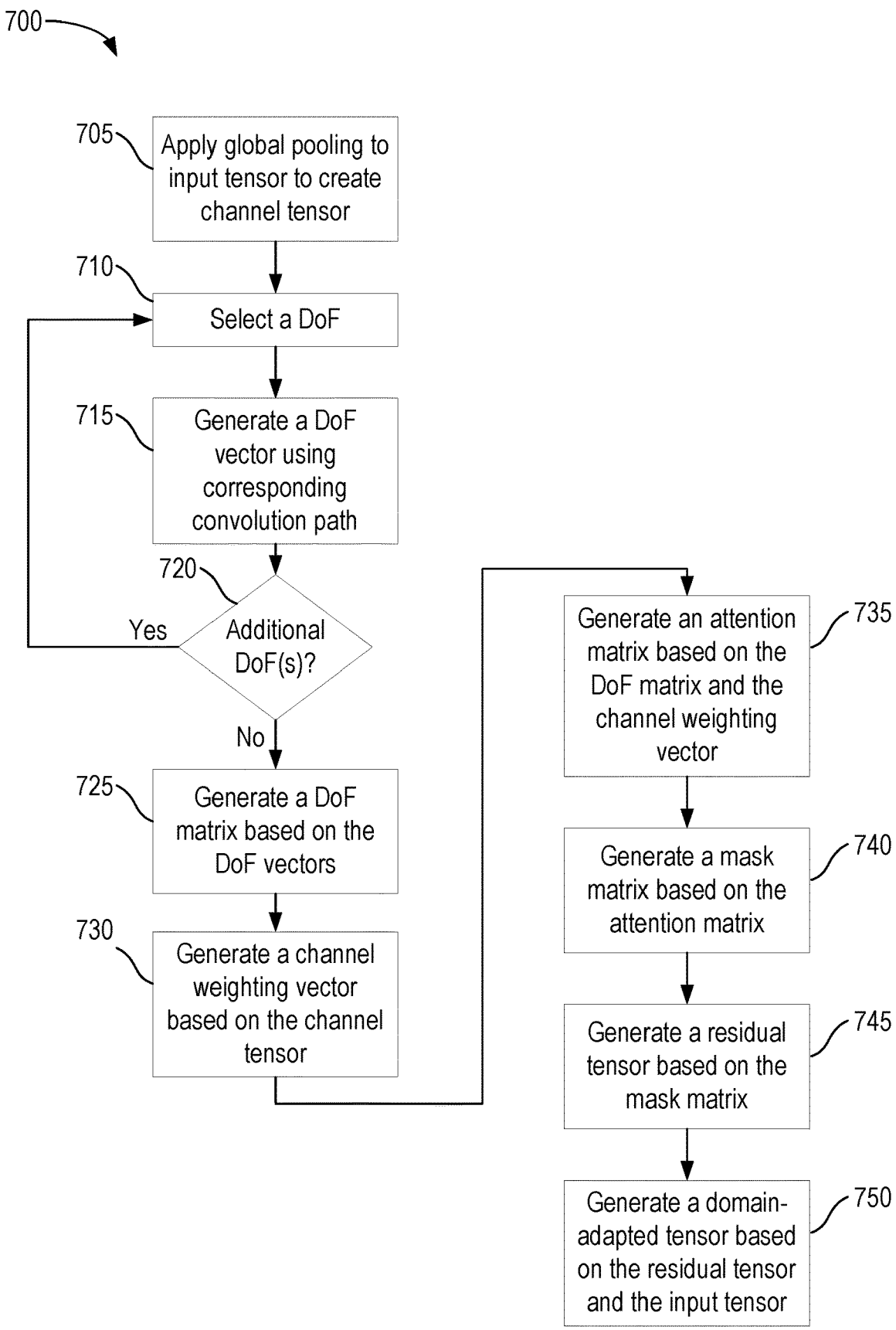
FIG. 7 depicts an example flow diagram illustrating a method for generating domain-adapted tensors.

FIG. 7 depicts an example flow diagram illustrating a method 700 for generating domain-adapted tensors. In one aspect, the method 700 provides additional detail for block 615 in FIG. 6. Similarly, in one aspect, the method 700 corresponds to one or more portions of the workflow 400 discussed above with reference to FIG. 4.

The method 700 begins at block 705, where a system (e.g., the analysis system 135 of FIG. 1) generates a channel tensor by applying a global pooling operation to the input tensor. For example, the global pooling operation may correspond to pooling operation 410 of FIG. 4. In at least one aspect, the pooling operation is performed on a per-channel basis, such that the data in each channel (e.g., for each Tx/Rx pair) is pooled within the channel (e.g., averaging each channel to a single value).

At block 710, the system selects a DoF of the received composite signal. In at least one aspect, as discussed above, the number of DoFs may correspond to the minimum of the number of transmitting antennas and the number of receiving antennas. In an aspect, the DoF may be selected in any way, as the system will process all DoFs. Additionally, though an iterative or sequential process is shown for conceptual clarity, in aspects, the system may process some or all of the DoFs in parallel.

At block 715, the system generates a DoF vector for the selected DoF using a corresponding convolution path in the domain adaptation network. In one aspect, the convolution path corresponds to a convolution path 422, discussed above with reference to FIG. 4. In at least one aspect, the convolution path may include channel projection (e.g., using convolution 425), nonlinearity at the bottleneck (e.g., using activation function 430), and channel expansion back to the original dimensionality (e.g., using convolution 435), as discussed above.

At block 720, the system determines whether all DoFs have been processed using a respective convolution path, or if one or more remain. If additional DoF(s) remain for processing, the method 700 returns to block 710 to process the next DoF. If all have been processed, then the method 700 continues to block 725.

At block 725, the system generates a DoF matrix based on the generated DoF vectors. For example, as discussed above with reference to the concatenation operation 440 of FIG. 4, the system may, for each DoF vector output by a respective convolution path, concatenate the channels of the DoF vector, and then concatenate all of the DoF vectors together to form the DoF matrix.

At block 730, the system can additionally generate a channel weighting vector based on the channel tensor. In at least one aspect, this can correspond to the convolution path including convolution 415 and activation function 420 discussed above with reference to FIG. 4.

The method 700 then continues to block 735, where the system performs matrix multiplication (e.g., matrix multiplication operation 445 in FIG. 4) on the DoF matrix and the channel weighting vector, in order to generate an attention matrix.

At block 740, the system generates a mask matrix based, at least in part, on the attention matrix. For example, the system may apply the transformation operation 450 of FIG. 4 to the attention matrix in order to generate the mask matrix.

At block 745, the system can then generate a residual tensor based at least in part on the generated mask matrix. In at least one embodiment, this can correspond to the multiplication operation 455 in FIG. 4, where the system can perform element-wise multiplication on the input tensor and the mask matrix.

At block 750, the residual tensor and the input tensor are used to generate an output domain-adapted tensor. In some aspects, this may correspond to the summation operation 465 in FIG. 4. In at least one aspect, the input tensor is first scaled using a linear map operation 460, as discussed above.

The domain-adapted tensor can then be used by downstream processing components (e.g., trained neural networks) to perform a variety of tasks in a domain-agnostic manner.

Note that FIG. 7 is just one example of a method, and other methods including fewer, additional, or alternative steps are possible consistent with this disclosure.

Example Method for Improved Positioning Using a Domain Adapted Model

Figure 8:
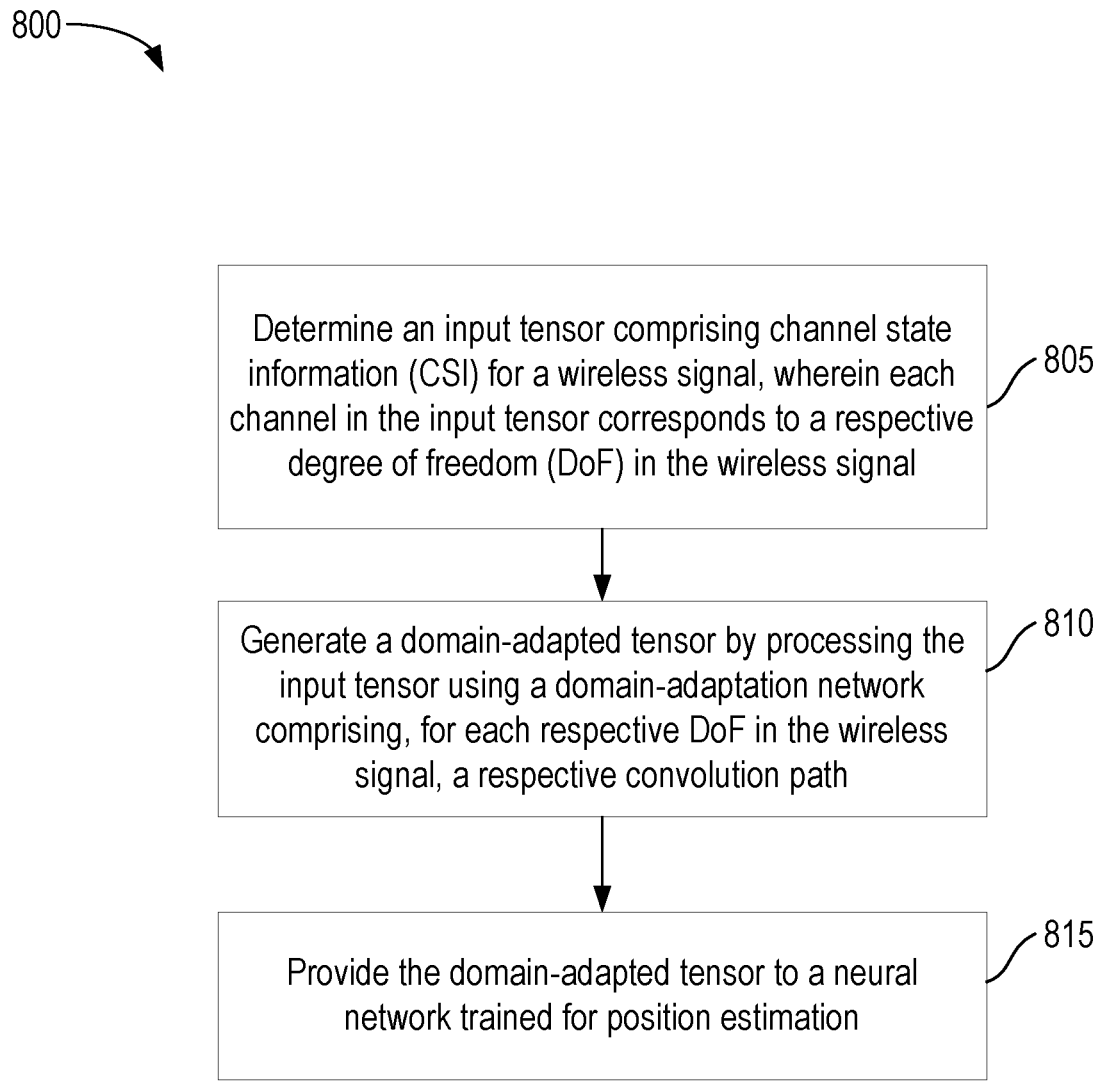
FIG. 8 depicts an example flow diagram illustrating a method for improved positioning using a domain-adapted model.

FIG. 8 depicts an example flow diagram illustrating a method 800 for improved positioning using a domain-adapted model. In some aspects, the method 800 is performed by an analysis system (e.g., analysis system 135 in FIG. 1).

At block 805, the analysis system determines an input tensor comprising channel state information (CSI) for a wireless signal, wherein each channel in the input tensor corresponds to a respective degree of freedom (DoF) in the wireless signal.

In some aspects, each DoF in the wireless signal corresponds to a transmitting antenna and receiving antenna pair for the wireless signal.

In some aspects, a first spatial dimension in the input tensor corresponds to a number of subcarriers per orthogonal frequency-division multiplexing (OFDM) symbol in the wireless signal, and a second spatial dimension in the input tensor corresponds to a number of OFDM symbols over time in the wireless signal.

At block 810, the analysis system generates a domain-adapted tensor by processing the input tensor using a domain-adaptation network comprising, for each respective DoF in the wireless signal, a respective convolution path.

In some aspects, processing the input tensor using the domain-adaptation network comprises: generating a channel tensor by applying a global pooling operation to the input tensor, generating a plurality of vectors by processing each respective channel in the channel tensor using a respective convolution path, generating a DoF matrix by concatenating the plurality of vectors, generating a channel weighting vector by processing the channel tensor using a softmax activation function, and generating an attention matrix by multiplying the DoF matrix and the channel weighting vector.

In some aspects, the method 800 also includes generating a mask matrix by processing the attention matrix using a non-linear transformation function.

In some aspects, the method 800 also includes processing the input tensor using a linear transformation to generate a scaled input tensor, and generating the domain-adapted tensor by adding the residual tensor and the scaled input tensor.

At block 815, the analysis system provides the domain-adapted tensor to a neural network trained for position estimation. In some aspects, the neural network processes the domain-adapted tensor to generate an output indicating one or more position estimations for one or more objects. In some aspects, the output is used to generate a loss used to refine the neural network.

In some aspects, providing the domain-adapted tensor to the neural network comprises providing the domain-adapted tensor to one or more feature extraction layers of the neural network.

In some aspects, the method 800 also includes applying one or more random affine transformations to a training data batch to produce a transformed training data batch, and applying one or more random affine transformations to a training data batch to produce a transformed training data batch.

In some aspects, applying the one or more random affine transformations is defined as Y'=UY+V, where Y' is the transformed training data batch, Y is the training data batch, and U and V are sampled from a distribution.

Note that FIG. 8 is just one example of a method, and other methods including fewer, additional, or alternative steps are possible consistent with this disclosure.

Example Processing System for Domain Adaptation

Figure 9:
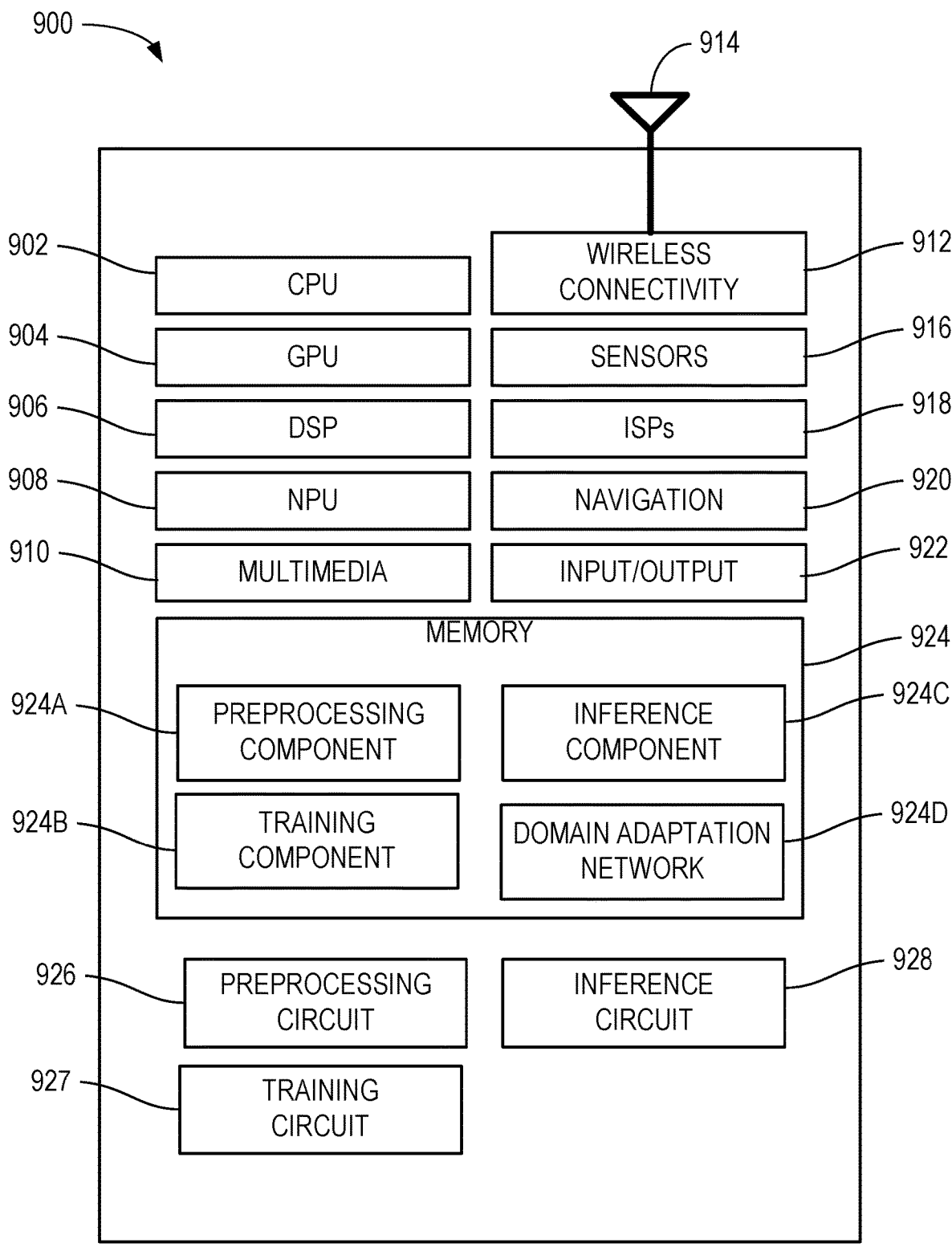
FIG. 9 depicts an example processing system configured to perform various aspects of the present disclosure.

In some aspects, the workflows, techniques, and methods described with reference to FIGS. 1-8 may be implemented on one or more devices or systems. FIG. 9 depicts an example processing system 900 configured to perform various aspects of the present disclosure, including, for example, the techniques and methods described with respect to FIGS. 1-8.

Processing system 900 includes a central processing unit (CPU) 902, which in some examples may be a multi-core CPU. Instructions executed at the CPU 902 may be loaded, for example, from a program memory associated with the CPU 902 or may be loaded from a memory partition 924.

Processing system 900 also includes additional processing components tailored to specific functions, such as a graphics processing unit (GPU) 904, a digital signal processor (DSP) 906, a neural processing unit (NPU) 908, a multimedia processing unit 910, and a wireless connectivity component 912.

An NPU, such as 908, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 908, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 908 is a part of one or more of CPU 902, GPU 904, and/or DSP 906.

In some examples, wireless connectivity component 912 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 912 is further connected to one or more antennas 914.

Processing system 900 may also include one or more sensor processing units 916 associated with any manner of sensor, one or more image signal processors (ISPs) 918 associated with any manner of image sensor, and/or a navigation processor 920, which may include satellite-based positioning system components (e.g., GPS or GLONASS) as well as inertial positioning system components.

Processing system 900 may also include one or more input and/or output devices 922, such as screens, touch-sensitive surfaces (including touch-sensitive displays), physical buttons, speakers, microphones, and the like.

In some examples, one or more of the processors of processing system 900 may be based on an ARM or RISC-V instruction set.

Processing system 900 also includes memory 924, which is representative of one or more static and/or dynamic memories, such as a dynamic random access memory, a flash-based static memory, and the like. In this example, memory 924 includes computer-executable components, which may be executed by one or more of the aforementioned processors of processing system 900.

In particular, in this example, memory 924 includes a preprocessing component 924A (which may correspond to the preprocessing component 137 in FIG. 1), a training component 924B (which may correspond to the training component 140 in FIG. 1) and an inference component 924C (which may correspond to the inference component 145 in FIG. 1). The memory 924 also includes one or more domain-adaptation networks 924D (which may correspond to the ML models 150 in FIG. 1). The depicted components, and others not depicted, may be configured to perform various aspects of the techniques described herein. Though depicted as discrete components for conceptual clarity in FIG. 9, preprocessing component 924A, training component 924B and inference component 924C may be collectively or individually implemented in various aspects.

Processing system 900 further comprises preprocessing circuit 926, training circuit 927, and inference circuit 928. The depicted circuits, and others not depicted, may be configured to perform various aspects of the techniques described herein.

For example, preprocessing component 924A and preprocessing circuit 926 may be used to perform preprocessing on the data, such as extraction of the relevant characteristics (e.g., CSI data), formatting the characteristics as an appropriate input tensor, and the like. Training component 924B and training circuit 927 may be used to train the domain adaptation models described herein (e.g., domain adaption network 924D). Inference component 924C and inference circuit 928 may be used to generate predictions (e.g., location predictions for positioning targets) using the domain adaptation network(s) 924D.

Though depicted as separate components and circuits for clarity in FIG. 9, preprocessing circuit 926, training circuit 927 and inference circuit 928 may collectively or individually be implemented in other processing devices of processing system 900, such as within CPU 902, GPU 904, DSP 906, NPU 908, and the like.

Generally, processing system 900 and/or components thereof may be configured to perform the methods described herein.

Notably, in other aspects, aspects of processing system 900 may be omitted, such as where processing system 900 is a server computer or the like. For example, multimedia component 910, wireless connectivity 912, sensors 916, ISPs 918, and/or navigation component 920 may be omitted in other aspects. Further, aspects of processing system 900 maybe distributed between multiple devices.

EXAMPLE CLAUSES

Clause 1: A method, comprising: determining an input tensor comprising channel state information (CSI) for a wireless signal, wherein each channel in the input tensor corresponds to a respective degree of freedom (DoF) in the wireless signal; generating a domain-adapted tensor by processing the input tensor using a domain-adaptation network comprising, for each respective DoF in the wireless signal, a respective convolution path; and providing the domain-adapted tensor to a neural network trained for position estimation.

Clause 2: The method according to Clause 1, wherein each DoF in the wireless signal corresponds to a transmitting antenna and receiving antenna pair for the wireless signal.

Clause 3: The method according to any one of Clauses 2-2, wherein processing the input tensor using the domain-adaptation network comprises: generating a channel tensor by applying a global pooling operation to the input tensor; generating a plurality of vectors by processing each respective channel in the channel tensor using a respective convolution path; generating a DoF matrix by concatenating the plurality of vectors; generating a channel weighting vector by processing the channel tensor using a softmax activation function; and generating an attention matrix by multiplying the DoF matrix and the channel weighting vector.

Clause 4: The method according to any one of Clauses 2-3, further comprising generating a mask matrix by processing the attention matrix using a non-linear transformation function.

Clause 5: The method according to any one of Clauses 2-4, further comprising generating a residual tensor by performing element-wise multiplication between the mask matrix and the input tensor.

Clause 6: The method according to any one of Clauses 2-5, further comprising: processing the input tensor using a linear transformation to generate a scaled input tensor; and generating the domain-adapted tensor by adding the residual tensor and the scaled input tensor.

Clause 7: The method according to any one of Clauses 2-6, wherein determining the input tensor comprises identifying CSI associated with each DoF based on a reference signal pattern used to transmit the wireless signal.

Clause 8: The method according to any one of Clauses 2-7, wherein providing the domain-adapted tensor to the neural network comprises providing the domain-adapted tensor to one or more feature extraction layers of the neural network.

Clause 9: The method according to any one of Clauses 2-8, wherein the neural network processes the domain-adapted tensor to generate an output indicating one or more position estimations for one or more objects.

Clause 10: The method according to any one of Clauses 2-9, wherein the output is used to generate a loss used to refine the neural network Clause 11: The method according to any one of Clauses 2-10, wherein: a first spatial dimension in the input tensor corresponds to a number of subcarriers per orthogonal frequency-division multiplexing (OFDM) symbol in the wireless signal; and a second spatial dimension in the input tensor corresponds to a number of OFDM symbols over time in the wireless signal.

Clause 12: The method according to any one of Clauses 2-11, further comprising: applying one or more random affine transformations to a training data batch to produce a transformed training data batch; and training each respective convolution path based on the training data batch and the transformed training data batch.

Clause 13: The method according to any one of Clauses 2-12, wherein applying the one or more random affine transformations is defined as $Y'=UY+V$, where: $Y'$ is the transformed training data batch; $Y$ is the training data batch; and $U$ and $V$ are sampled from a distribution.

Clause 14: A system, comprising: a memory comprising computer-executable instructions; and one or more processors configured to execute the computer-executable instructions and cause the processing system to perform a method in accordance with any one of Clauses 2-13.

Clause 15: A system, comprising means for performing a method in accordance with any one of Clauses 2-13.

Clause 16: A non-transitory computer-readable medium comprising computer-executable instructions that, when executed by one or more processors of a processing system, cause the processing system to perform a method in accordance with any one of Clauses 2-13.

Clause 17: A computer program product embodied on a computer-readable storage medium comprising code for performing a method in accordance with any one of Clauses 2-13.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s)

and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   determining an input tensor comprising channel state information (CSI) for a wireless signal, wherein each channel in the input tensor corresponds to a respective degree of freedom (DoF) in the wireless signal;
   generating a domain-adapted tensor by processing the input tensor using a domain-adaptation network comprising, for each respective DoF in the wireless signal, a respective convolution path; and
   providing the domain-adapted tensor to a neural network trained for position estimation.

2. The method of claim 1, wherein each DoF in the wireless signal corresponds to a transmitting antenna and receiving antenna pair for the wireless signal.

3. The method of claim 2, wherein processing the input tensor using the domain-adaptation network comprises:
   generating a channel tensor by applying a global pooling operation to the input tensor;
   generating a plurality of vectors by processing each respective channel in the channel tensor using a respective convolution path;
   generating a DoF matrix by concatenating the plurality of vectors;
   generating a channel weighting vector by processing the channel tensor using a softmax activation function; and
   generating an attention matrix by multiplying the DoF matrix and the channel weighting vector.

4. The method of claim 3, further comprising generating a mask matrix by processing the attention matrix using a non-linear transformation function.

5. The method of claim 4, further comprising generating a residual tensor by performing element-wise multiplication between the mask matrix and the input tensor.

6. The method of claim 5, further comprising:
   processing the input tensor using a linear transformation to generate a scaled input tensor; and
   generating the domain-adapted tensor by adding the residual tensor and the scaled input tensor.

7. The method of claim 2, wherein determining the input tensor comprises identifying CSI associated with each DoF based on a reference signal pattern used to transmit the wireless signal.

8. The method of claim 1, wherein providing the domain-adapted tensor to the neural network comprises providing the domain-adapted tensor to one or more feature extraction layers of the neural network.

9. The method of claim 1, wherein:
   a first spatial dimension in the input tensor corresponds to a number of subcarriers per orthogonal frequency-division multiplexing (OFDM) symbol in the wireless signal; and
   a second spatial dimension in the input tensor corresponds to a number of OFDM symbols over time in the wireless signal.

10. The method of claim 1, further comprising:
    applying one or more random affine transformations to a training data batch to produce a transformed training data batch; and
    training each respective convolution path based on the training data batch and the transformed training data batch.

11. The method of claim 10, wherein applying the one or more random affine transformations is defined as $Y'=UY+V$, where:
    $Y'$ is the transformed training data batch;
    $Y$ is the training data batch; and
    $U$ and $V$ are sampled from a distribution.

12. A processing system, comprising:
    a memory comprising computer-executable instructions; and
    one or more processors configured to execute the computer-executable instructions and cause the processing system to perform an operation comprising:
       determining an input tensor comprising channel state information (CSI) for a wireless signal, wherein each channel in the input tensor corresponds to a respective degree of freedom (DoF) in the wireless signal;
       generating a domain-adapted tensor by processing the input tensor using a domain-adaptation network comprising, for each respective DoF in the wireless signal, a respective convolution path; and
       providing the domain-adapted tensor to a neural network trained for position estimation.

13. The processing system of claim 12, wherein each DoF in the wireless signal corresponds to a transmitting antenna and receiving antenna pair for the wireless signal.

14. The processing system of claim 13, wherein processing the input tensor using the domain-adaptation network comprises:
    generating a channel tensor by applying a global pooling operation to the input tensor;
    generating a plurality of vectors by processing each respective channel in the channel tensor using a respective convolution path;
    generating a DoF matrix by concatenating the plurality of vectors;
    generating a channel weighting vector by processing the channel tensor using a softmax activation function; and
    generating an attention matrix by multiplying the DoF matrix and the channel weighting vector.

15. The processing system of claim 14, the operation further comprising:
    generating a mask matrix by processing the attention matrix using a non-linear transformation function;
    generating a residual tensor by performing element-wise multiplication between the mask matrix and the input tensor;
    processing the input tensor using a linear transformation to generate a scaled input tensor; and generating the domain-adapted tensor by adding the residual tensor and the scaled input tensor.

16. The processing system of claim 13, wherein determining the input tensor comprises identifying CSI associated with each DoF based on a reference signal pattern used to transmit the wireless signal.

17. The processing system of claim 12, wherein providing the domain-adapted tensor to the neural network comprises providing the domain-adapted tensor to one or more feature extraction layers of the neural network.

18. The processing system of claim 12, wherein:
a first spatial dimension in the input tensor corresponds to a number of subcarriers per orthogonal frequency-division multiplexing (OFDM) symbol in the wireless signal; and
a second spatial dimension in the input tensor corresponds to a number of OFDM symbols over time in the wireless signal.

19. The processing system of claim 12, the operation further comprising:
applying one or more random affine transformations to a training data batch to produce a transformed training data batch; and
training each respective convolution path based on the training data batch and the transformed training data batch.

20. The processing system of claim 19, wherein applying the one or more random affine transformations is defined as Y'=UY+V, where:
Y' is the transformed training data batch;
Y is the training data batch; and
U and V are sampled from a distribution.

21. A non-transitory computer-readable medium comprising computer-executable instructions that, when executed by one or more processors of a processing system, cause the processing system to perform an operation comprising:
determining an input tensor comprising channel state information (CSI) for a wireless signal, wherein each channel in the input tensor corresponds to a respective degree of freedom (DoF) in the wireless signal;
generating a domain-adapted tensor by processing the input tensor using a domain-adaptation network comprising, for each respective DoF in the wireless signal, a respective convolution path; and
providing the domain-adapted tensor to a neural network trained for position estimation.

22. The non-transitory computer-readable medium of claim 21, wherein each DoF in the wireless signal corresponds to a transmitting antenna and receiving antenna pair for the wireless signal.

23. The non-transitory computer-readable medium of claim 22, wherein processing the input tensor using the domain-adaptation network comprises:
generating a channel tensor by applying a global pooling operation to the input tensor;
generating a plurality of vectors by processing each respective channel in the channel tensor using a respective convolution path;
generating a DoF matrix by concatenating the plurality of vectors;
generating a channel weighting vector by processing the channel tensor using a softmax activation function; and
generating an attention matrix by multiplying the DoF matrix and the channel weighting vector.

24. The non-transitory computer-readable medium of claim 23, the operation further comprising:
generating a mask matrix by processing the attention matrix using a non-linear transformation function;
generating a residual tensor by performing element-wise multiplication between the mask matrix and the input tensor;
processing the input tensor using a linear transformation to generate a scaled input tensor; and
generating the domain-adapted tensor by adding the residual tensor and the scaled input tensor.

25. The non-transitory computer-readable medium of claim 22, wherein determining the input tensor comprises identifying CSI associated with each DoF based on a reference signal pattern used to transmit the wireless signal.

26. The non-transitory computer-readable medium of claim 21, wherein providing the domain-adapted tensor to the neural network comprises providing the domain-adapted tensor to one or more feature extraction layers of the neural network.

27. The non-transitory computer-readable medium of claim 21, wherein:
a first spatial dimension in the input tensor corresponds to a number of subcarriers per orthogonal frequency-division multiplexing (OFDM) symbol in the wireless signal; and
a second spatial dimension in the input tensor corresponds to a number of OFDM symbols over time in the wireless signal.

28. The non-transitory computer-readable medium of claim 21, further comprising:
applying one or more random affine transformations to a training data batch to produce a transformed training data batch; and
training each respective convolution path based on the training data batch and the transformed training data batch.

29. The non-transitory computer-readable medium of claim 28, wherein applying the one or more random affine transformations is defined as Y'=UY+V, where:
Y' is the transformed training data batch;
Y is the training data batch; and
U and V are sampled from a distribution.

30. A processing system, comprising:
means for determining an input tensor comprising channel state information (CSI) for a wireless signal, wherein each channel in the input tensor corresponds to a respective degree of freedom (DoF) in the wireless signal;
means for generating a domain-adapted tensor by processing the input tensor using a domain-adaptation network comprising, for each respective DoF in the wireless signal, a respective convolution path; and
means for providing the domain-adapted tensor to a neural network trained for position estimation.

* * * * *